(12) United States Patent
Dudar

(10) Patent No.: US 11,815,041 B2
(45) Date of Patent: Nov. 14, 2023

(54) BLEED CANISTER OF A VEHICLE EVAPORATIVE EMISSIONS CONTROL SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 17/447,979

(22) Filed: Sep. 17, 2021

(65) Prior Publication Data

US 2023/0095743 A1    Mar. 30, 2023

(51) Int. Cl.
| | |
|---|---|
| F02D 41/00 | (2006.01) |
| F02M 25/08 | (2006.01) |
| F01N 13/10 | (2010.01) |
| F01N 13/00 | (2010.01) |
| F02M 35/10 | (2006.01) |
| B01D 53/04 | (2006.01) |
| F01N 11/00 | (2006.01) |

(52) U.S. Cl.
CPC .......... *F02D 41/004* (2013.01); *B01D 53/0415* (2013.01); *F01N 11/007* (2013.01); *F01N 13/008* (2013.01); *F01N 13/10* (2013.01); *F02M 25/0836* (2013.01); *F02M 25/0854* (2013.01); *F02M 35/10222* (2013.01); *B01D 2253/102* (2013.01); *B01D 2257/702* (2013.01); *B01D 2259/4516* (2013.01); *B01D 2259/4566* (2013.01)

(58) Field of Classification Search
CPC ....... F02D 41/004; F01N 13/008; F01N 13/10; F01N 11/007; F02M 25/0836; F02M 25/0854; F02N 35/10222; B01D 53/0415; B01D 2253/102; B01D 2257/702; B01D 2259/4516; B01D 2259/4566
See application file for complete search history.

(56) References Cited

U.S. PATENT DOCUMENTS

| | | | | |
|---|---|---|---|---|
| 5,806,500 | A * | 9/1998 | Fargo et al. | F02M 25/0872 123/198 D |
| 8,776,496 | B2* | 7/2014 | Uhrich et al. | F01N 3/2832 60/287 |
| 8,915,070 | B2* | 12/2014 | Uhrich et al. | F02D 41/0025 60/285 |
| 9,611,814 | B2 | 4/2017 | Dudar | |
| 9,732,685 | B2* | 8/2017 | Dudar | F02M 25/08 |
| 10,047,705 | B2 | 8/2018 | Dudar et al. | |
| 10,830,189 | B1* | 11/2020 | Dudar | F02M 25/0836 |
| 10,927,795 | B2* | 2/2021 | Matsunaga et al. | F02M 25/0836 |

(Continued)

FOREIGN PATENT DOCUMENTS

JP     2004263652 A    9/2004

*Primary Examiner* — Jacob M Amick
*Assistant Examiner* — Sherman D Manley
(74) *Attorney, Agent, or Firm* — Vincent Mastrogiacomo; McCoy Russell LLP

(57) ABSTRACT

Methods and systems are provided for carrying out diagnostics of a bleed canister of an evaporative emissions control system in a vehicle. In one example, a method may include, loading the bleed canister during a refueling event, and then during an immediately subsequent engine start, detecting if the bleed canister is degraded or not based on output of an exhaust gas oxygen sensor.

17 Claims, 7 Drawing Sheets

(56) References Cited

U.S. PATENT DOCUMENTS

| | | | | |
|---|---|---|---|---|
| 11,293,381 | B1* | 4/2022 | Dudar | F02M 25/0836 |
| 11,333,095 | B1* | 5/2022 | Dudar | F02D 41/004 |
| 2016/0201613 | A1* | 7/2016 | Ulrey et al. | F02M 25/089 |
| | | | | 123/520 |
| 2016/0201615 | A1* | 7/2016 | Pursifull et al. | F02D 41/26 |
| | | | | 123/520 |
| 2016/0215734 | A1* | 7/2016 | Dudar | F02M 25/0836 |
| 2017/0198671 | A1* | 7/2017 | Dudar | F02M 35/104 |
| 2017/0260914 | A1* | 9/2017 | Dudar et al. | F02M 25/0854 |
| 2017/0363046 | A1* | 12/2017 | Dudar et al. | F02D 41/042 |
| 2019/0234326 | A1* | 8/2019 | Dudar | F02D 29/02 |

\* cited by examiner

BLEED CANISTER OF A VEHICLE EVAPORATIVE EMISSIONS CONTROL SYSTEM

FIELD

The present description relates generally to methods and systems for carrying out diagnostics of a bleed canister of an evaporative emissions control system in a vehicle.

BACKGROUND/SUMMARY

Vehicles are fitted with evaporative emissions control (EVAP) systems to reduce the release of fuel vapors to the atmosphere. For example, vaporized hydrocarbons (HCs) from a fuel tank may be stored in one or more fuel vapor canisters packed with an adsorbent which adsorbs and stores the fuel vapors. At a later time, when the engine is in operation, the EVAP system allows the fuel vapors stored in the fuel vapor canisters to be purged into the engine intake manifold from the fuel vapor canister. The fuel vapors are then consumed during combustion.

In addition to the one or more fuel vapor canisters, certain vehicles may include a bleed canister housed in a vent line of the EVAP system downstream of the one or more fuel vapor canisters. The bleed canister may include a highly restrictive structure of honeycombed patterns to trap any HCs escaping the one or more fuel vapor canisters. The presence of the bleed canister reduces the possibility of any bleed emissions to escape the EVAP system. The bleed canister may be loaded upon the EVAP system being exposed to multiple diurnal cycles with significant temperature variations.

Diagnostics of the fuel vapor canisters may be carried out during certain vehicle conditions such as via engine off natural vacuum test or by using an Evaporative Leak Check Module. One example approach to diagnose a HC trap housed in a bypass passage downstream of a fuel vapor canister and an exhaust emissions control device is shown by Uhrich et al. in U.S. 8,915,070. The HC trap is periodically or opportunistically purged to the engine cylinders. Therein, a condition of the HC trap may be diagnosed based on detecting change in a temperature condition of gas during purging of gases through the HC trap.

However, the inventors herein have recognized potential issues with such systems. As one example, since the HC trap shown by Uhrich et al. is positioned downstream of the emissions control device along with the fuel vapor canister, a higher volume of HC may be trapped in the HC trap. The frequent purging of the HC trap provides periodic opportunities for HC trap diagnostics. Since due to operating conditions of the vehicle and weather conditions, loading and purging of the bleed canister may receive bleed HCs only from the one or more fuel vapor canisters is not regularly carried out. The fuel vapor canisters are sized to absorb all fuel vapors generated during conditions such as refueling, providing little opportunity for bleed canister loading. Also, conditions for diagnostics of the bleed canister may be infrequent. In absence of regular diagnostics, any degradation of the bleed canister may be remain undetected causing undesired increase in emissions level during bleeding of HC from the one or more fuel vapor canisters.

In one example, the issues described above may be addressed by a method for an engine, comprising: during a refueling event, upon a fuel fill level (FLI) reaching a threshold, directing fuel vapors solely to a bleed canister of an evaporative emissions control (EVAP) system, and during a subsequent engine start, indicating if the bleed canister is robust or degraded based on output of an exhaust gas sensor. In this way, by carrying out diagnostics of the bleed canister during refueling, any degradation of the bleed canister may be timely detected and suitable mitigating steps may be undertaken.

As one example, the vehicle EVAP system may include a plurality of fuel vapor canisters coupled to a vent line and a bleed canister housed in the vent line downstream of each of the plurality of the fuel vapor canisters. Each canister may include a bypass passages having a bypass valve. During a refueling event when the one or more fuel vapor canisters are substantially clean (purged), the fuel vapor generated in the fuel tank and fuel lines may be routed to the fuel vapor canisters via an open fuel tank isolation valve (FTIV). The bypass valves may be open to route the fuel vapor to the first canister first, and then based on the loading of the first canister, to the other downstream canisters. Due to the capacity of the canisters, no fuel vapor may reach the bleed canister. Upon the fuel level in the fuel tank increasing to 90% capacity, each of the bypass valves of the canister may be closed to route the entire fuel vapor to the bleed canister (bypassing each of the plurality of fuel vapor canisters). The bleed canister may be loaded over the remaining duration of the refueling and then the FTIV may be closed. During an immediately subsequent engine start, a fuel purge valve connecting the fuel vapor canisters and the bleed canister to the engine intake manifold may be opened while maintaining the bypass valves open to allow the fuel vapor adsorbed at the bleed canister to be first purged. During the purge, an output of a universal exhaust gas oxygen (UEGO) sensor may be monitored over a threshold duration. As the HC are combusted in the engine cylinders, the UEGO output may be initially richer than stoichiometric, and after the entire volume of HC has been purged out of the bleed canister and combusted, the UEGO output may switch to stoichiometric or leaner than stoichiometric. If it is observed that the UEGO output does not change over the threshold duration, it may be inferred that the bleed canister was not able to trap the HCs during the refueling and purging was not successful, and a diagnostic code may be set for a degraded bleed canister. In response to the degraded bleed canister, purge schedule for the plurality of fuel vapor canisters may be increased to reduce the possibility of HCs bleeding from a canister loaded to capacity.

In this way, by regularly carrying out diagnostics of the bleed canister during a refueling event, any degradation of the bleed canister may be identified without delay and addressed. By loading the bleed canister towards the end of the refueling, the bleed canister may be loaded to capacity yet not overloaded to reduce possibility of HC release to the atmosphere. In response to detection of degradation of the bleed canister, the technical effect of taking mitigating steps to limit bleeding of HCs from the fuel vapor canisters is that undesired release of HCs to the atmosphere via a degraded bleed canister may be averted and emissions quality may be maintained. By maintaining a robust EVAP system, it is possible to operate practically zero emissions vehicles (PZEV).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
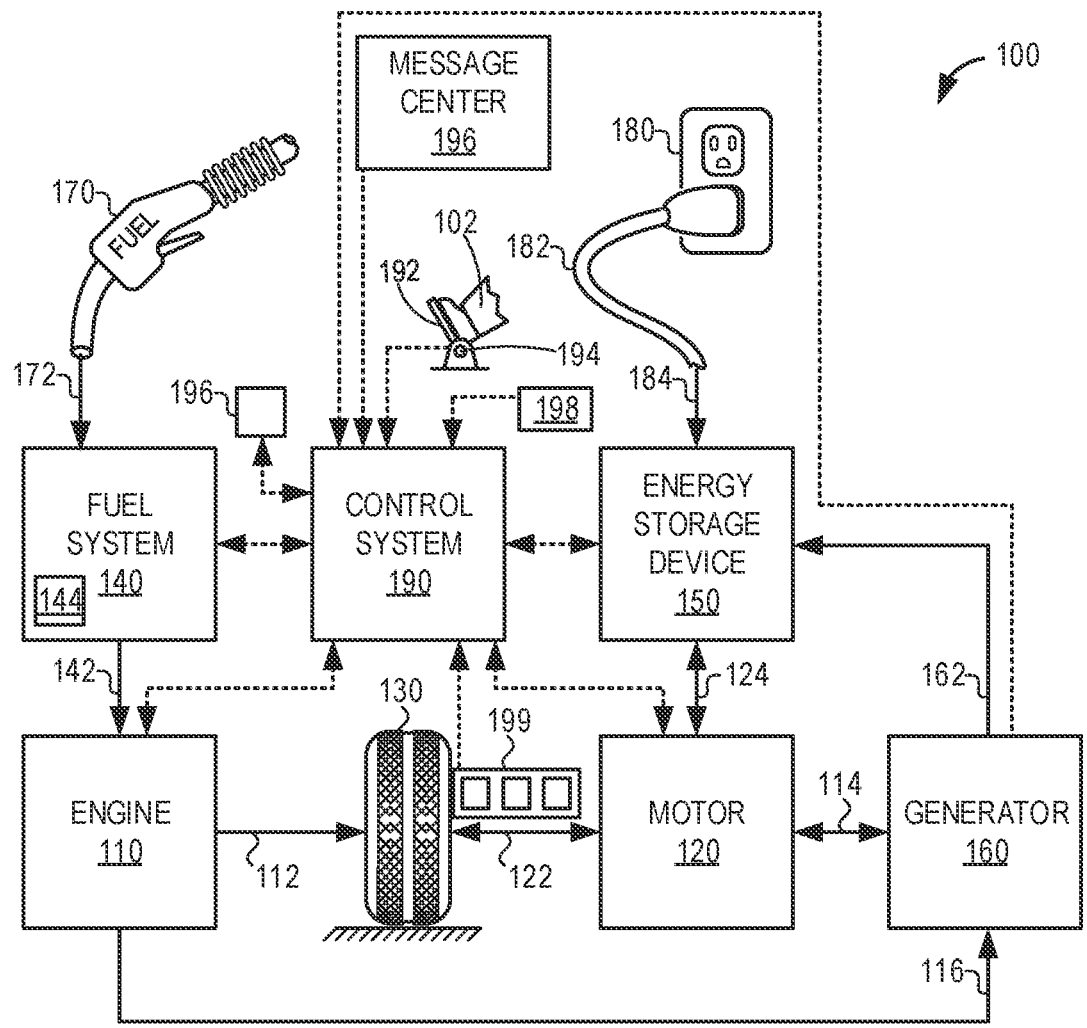
FIG. 1 shows an example hybrid vehicle propulsion system.
Figure 2:
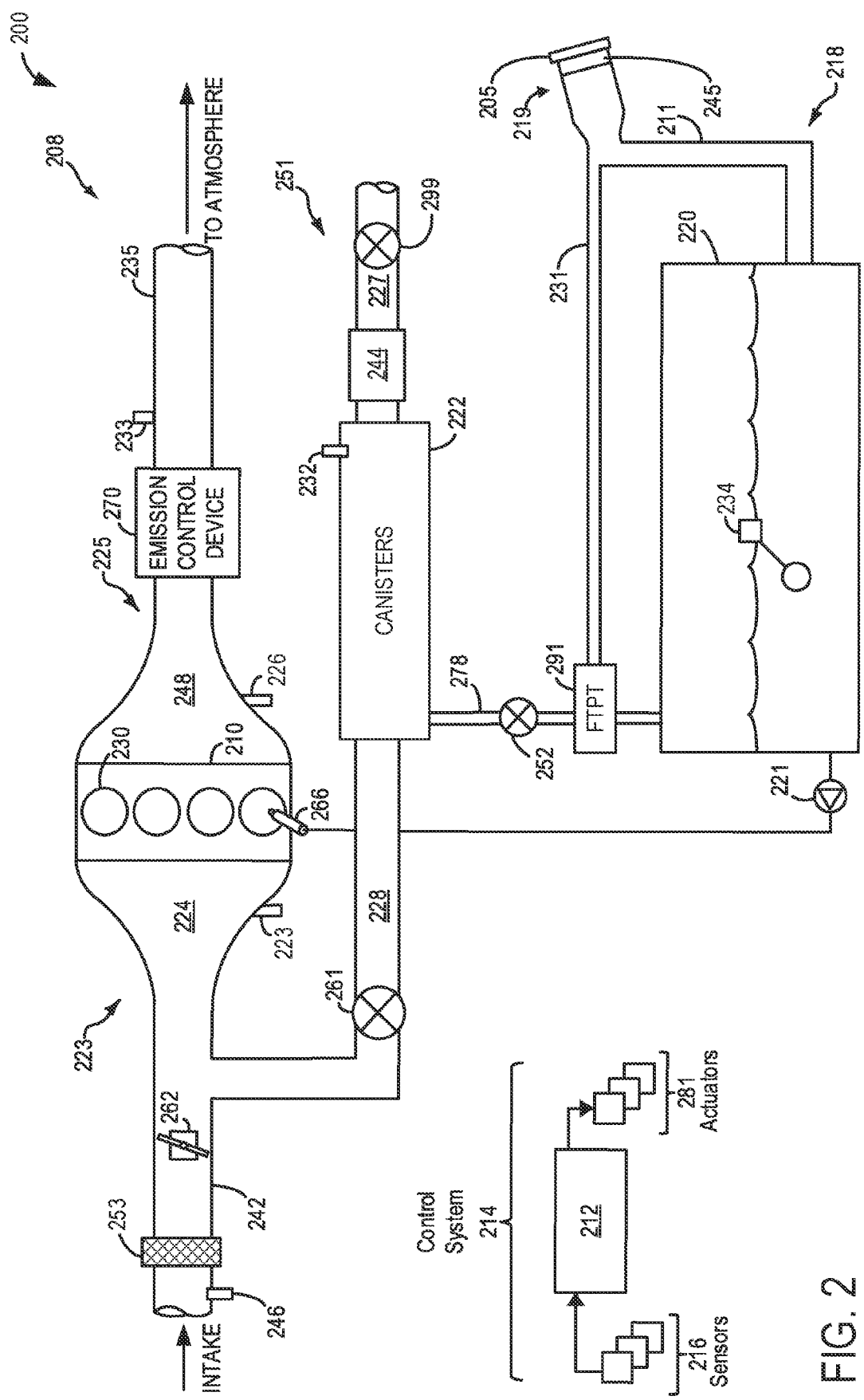
FIG. 2 shows an example vehicle engine system including a fuel system and an evaporative emissions control (EVAP) system.
Figure 3A:
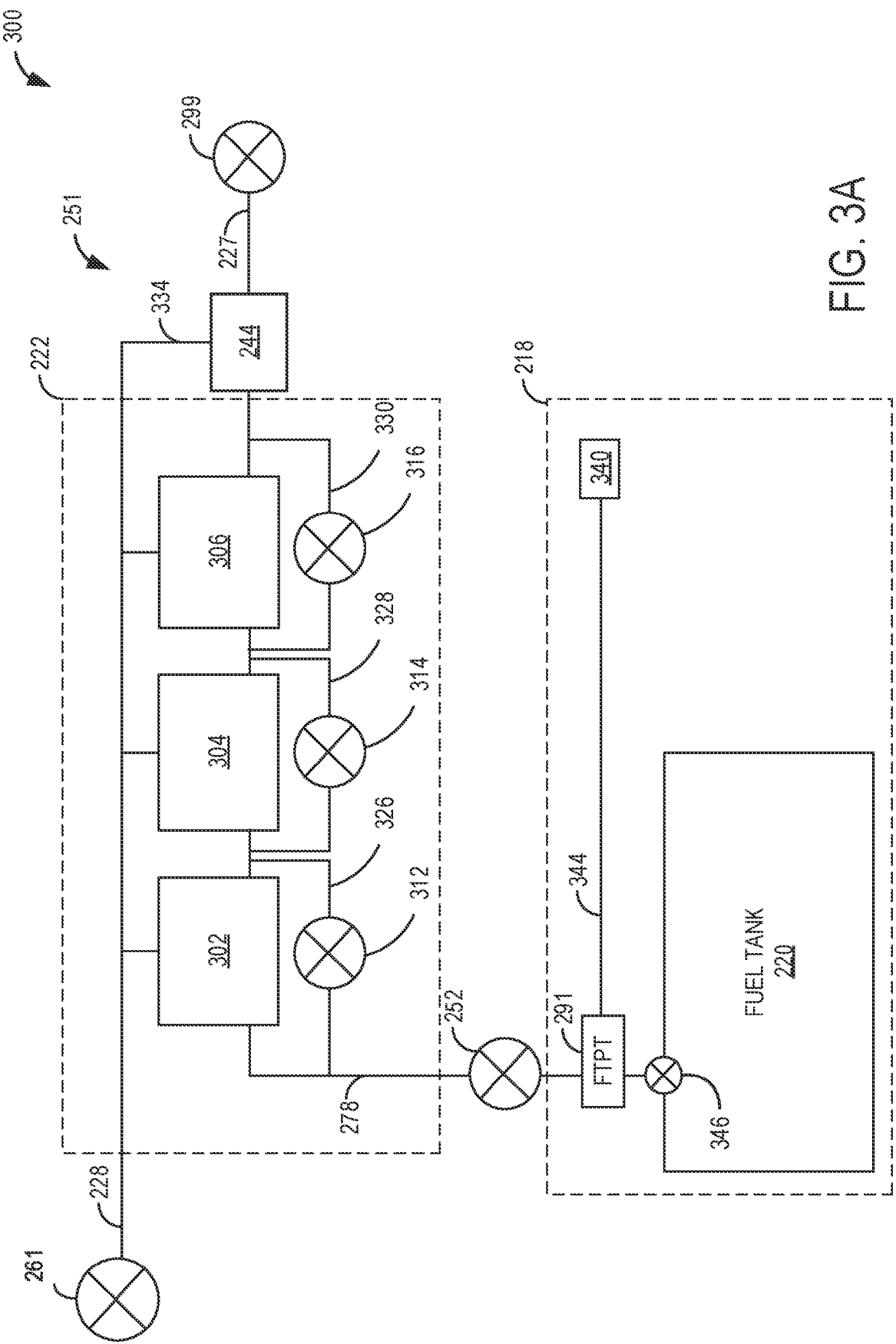
FIG. 3A shows an example EVAP system including a plurality of fuel vapor canisters and a bleed canister.
Figure 3B:
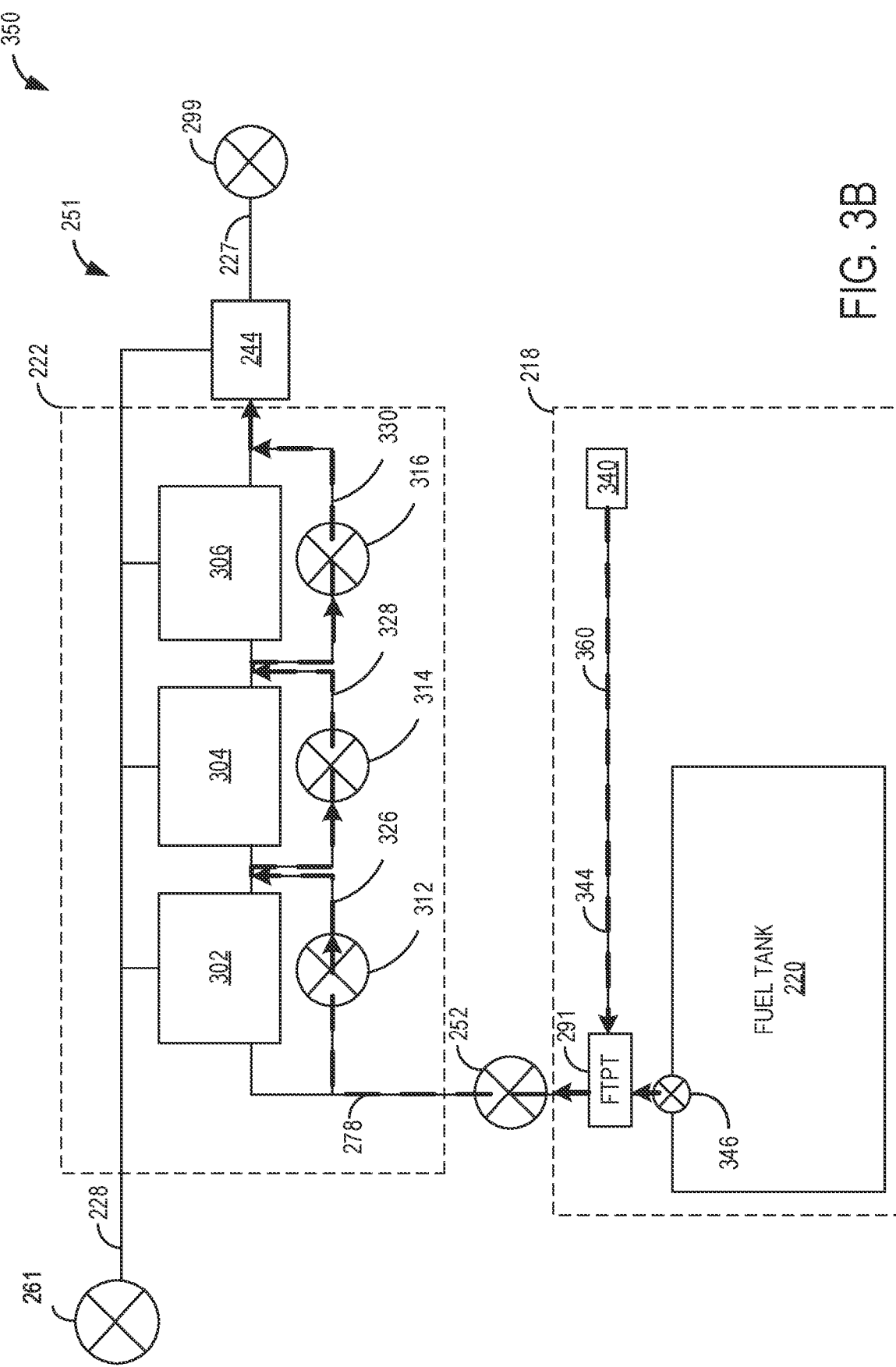
FIG. 3B shows operation of the EVAP system of FIG. 3A during diagnostics of the bleed canister while the fuel tank is refueled.
Figure 3C:
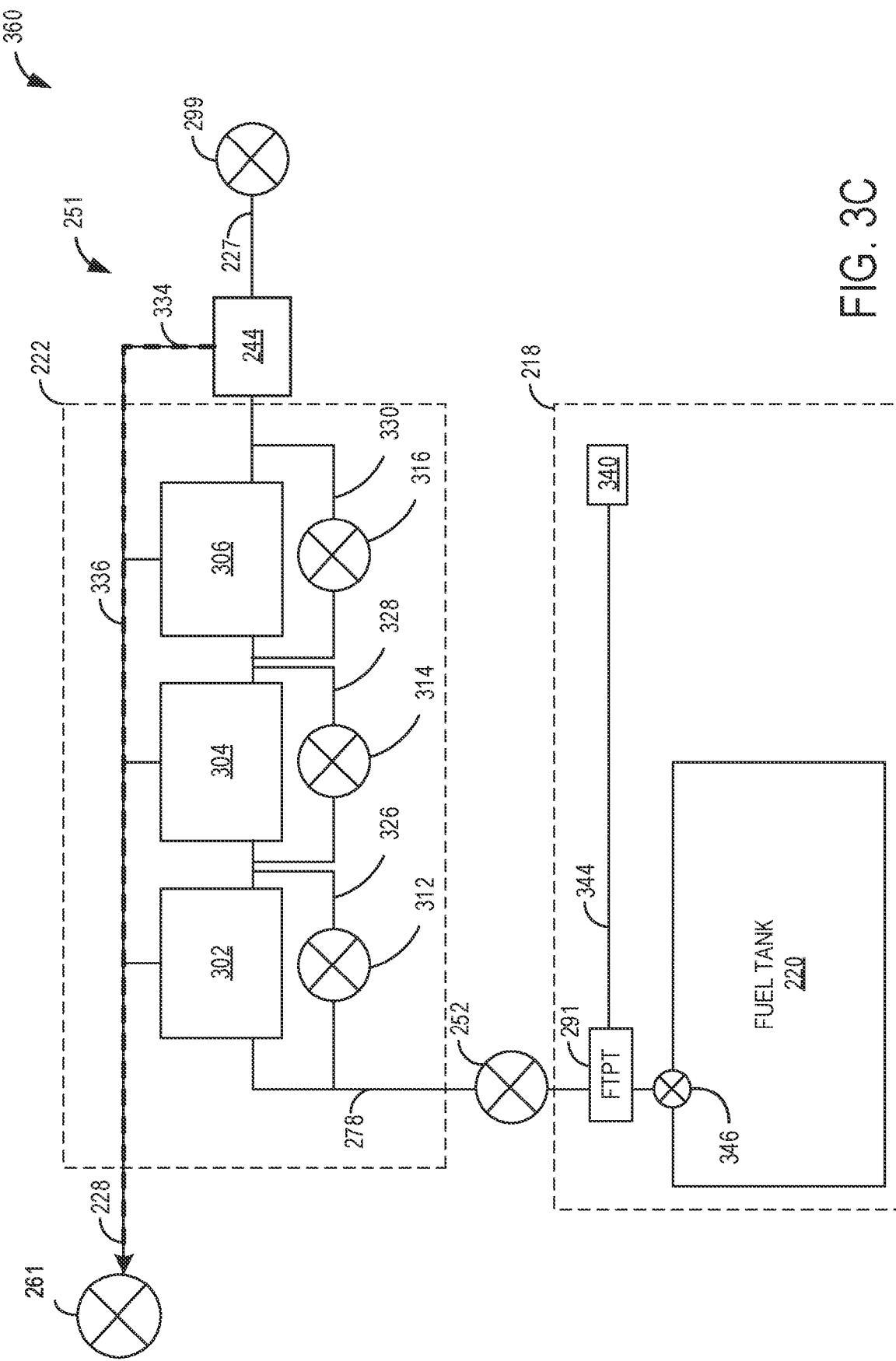
FIG. 3C shows operation of the EVAP system of FIG. 3A during diagnostics of the bleed canister while the bleed canister is purged.
Figure 4:
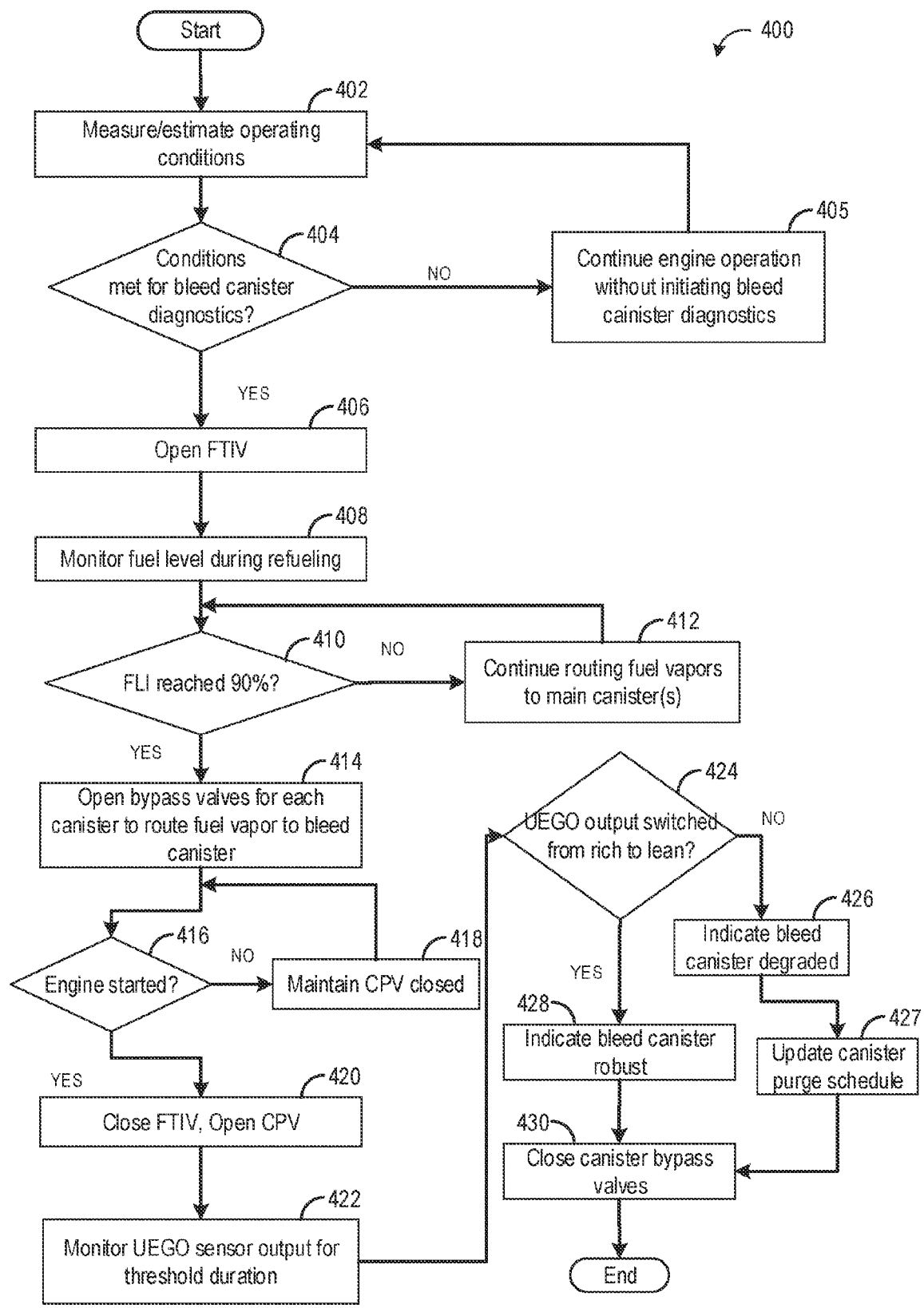
FIG. 4 shows a flowchart illustrating an example method for diagnostics of the bleed canister during a refueling event.
Figure 5:
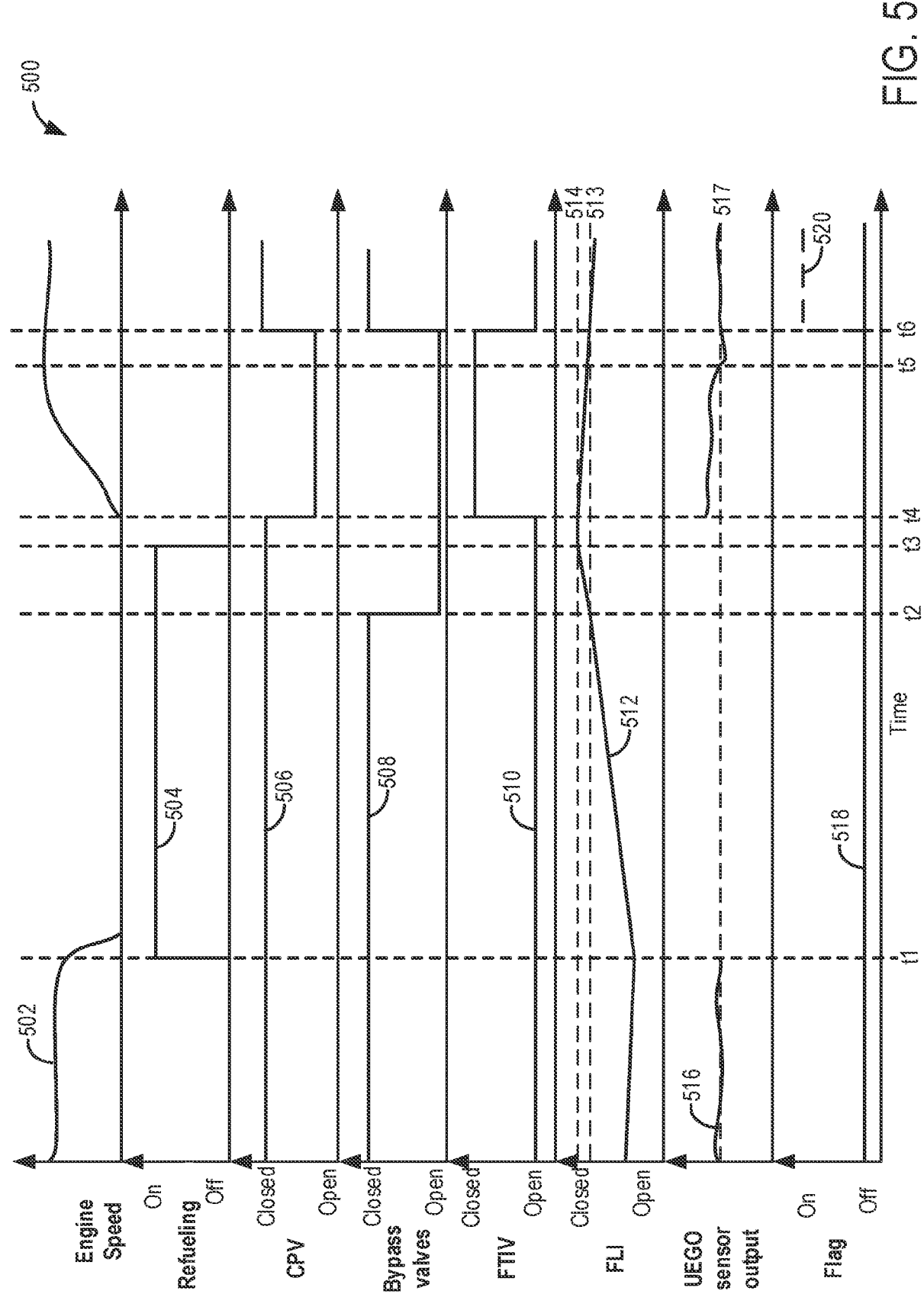
FIG. 5 shows a timeline of an example diagnostics of the bleed canister.

The following description relates to systems and methods for carrying out diagnostics of a bleed canister of an evaporative emissions control (EVAP) system in a vehicle such as a hybrid vehicle as shown in FIG. 1. The EVAP system and the fuel system is shown in FIG. 2. The EVAP system may include a plurality of canisters and a bleed canister as shown in FIG. 3A to trap fuel vapors. The bleed canister may be diagnosed for degradation during a refueling event. Routing of fuel vapors to load and purge the bleed canister during a diagnostic routine is shown in FIGS. 3B-3C. A controller may be configured to perform a control routine, such as the example routine of FIG. 4, to carry out diagnostics of the bleed canister. An example of bleed canister diagnostics is shown in FIG. 5.

FIG. 1 illustrates an example vehicle propulsion system 100. Vehicle propulsion system 100 includes a fuel burning engine 110 and a motor 120. As a non-limiting example, engine 110 comprises an internal combustion engine, and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV) or simply a hybrid vehicle. Alternatively, the propulsion system 100 depicted herein may be termed a plug-in hybrid electric vehicle (PHEV).

Vehicle propulsion system 100 may be operated in a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated (herein also referred to as an electric mode). Herein, the engine may be shut down to rest while the motor propels vehicle motion.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator operation in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated (herein also referred to as an engine mode). During other operating conditions, both engine 110 and motor 120 may each be operated to propel the vehicle via drive wheel 130 as indicated by arrows 112 and 122, respectively (herein also referred to as an assist mode). A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator operation to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Thus, liquid fuel may be supplied from fuel tank 144 to engine 110 of the motor vehicle shown in FIG. 1. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

The vehicle propulsion system 100 may also include an ambient temperature/humidity sensor 198 and a roll stability control sensor, such as a lateral and/or longitudinal and/or yaw rate sensor(s) 199. Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

FIG. 2 shows a schematic depiction of a vehicle system 200. The vehicle system 200 includes an engine system 208 coupled to a fuel system 218 and an EVAP system 251. EVAP system 251 includes one or more fuel vapor containers 222 (also referred herein as main fuel vapor canisters) which may be used to capture and store fuel vapors.

In some examples, vehicle system 200 may be a hybrid electric vehicle system, such as the vehicle propulsion system 100 of FIG. 1. The engine system 208 may include an engine 210 having a plurality of cylinders 230. As such, engine 210 may be to the same as engine 110 of FIG. 1 while control system 214 of FIG. 2 may be the same as control system 190 of FIG. 1.

The engine 210 includes an engine intake 223 and an engine exhaust 225. The engine intake 223 includes a throttle 262 fluidly coupled to the intake manifold 224. Fresh intake air enters intake passage 242 and flows through air filter 253. Air filter 253 positioned in the intake passage 242 may clean intake air before the intake air is directed to the intake manifold 224. Cleaned intake air exiting the air filter 253 may stream past throttle 262 (also termed intake throttle 262) into intake manifold 224 via intake passage 242. As such, intake throttle 262, when fully opened, may enable a higher level of fluidic communication between intake manifold 224 and intake passage 242 downstream of air filter 253. An amount of intake air provided to the intake manifold 224 may be regulated via throttle 262 based on engine operating conditions. The engine exhaust 225 includes an exhaust manifold 248 leading to an exhaust passage 235 that routes exhaust gas to the atmosphere. An exhaust gas sensor 226 may be coupled to exhaust manifold 248. The exhaust gas sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. The emission control devices 270 may include a universal exhaust gas oxygen (UEGO) sensor, which may be used to estimate a combustion air/fuel ratio from a measurement of oxygen in exhaust gas of the vehicle. It will be appreciated that other components may be included in the engine such as a variety of valves and sensors.

The vehicle system 200 may include a control system 214. Control system 214 is shown receiving information from a plurality of sensors 216 (examples of which are described herein) and sending control signals to a plurality of actuators 281 (examples of which are described herein). As one example, sensors 216 may include manifold absolute pressure (MAP) sensor 223, barometric pressure (BP) sensor 246, exhaust gas sensor 226 located in exhaust manifold 248 upstream of the emission control device, temperature sensor 233, fuel tank pressure sensor 291 (also termed a fuel tank pressure transducer or FTPT), and one or more canister temperature sensors 232. Other sensors such as pressure, temperature, air/fuel ratio, and composition sensors may be coupled to various locations in the vehicle system 200. As another example, the actuators may include CPV 261, fuel injector 266, throttle 262, FTIV 252, fuel pump 221, and refueling lock 245. It should be appreciated that the examples provided herein are for illustrative purposes and other types of sensors and/or actuators may be included without departing from the scope of this disclosure.

The control system 214 may include a controller 212. The controller may receive input data from the various sensors, process the input data, and trigger the actuators in response to the processed input data based on instruction or code programmed therein corresponding to one or more routines. The controller 212 may include a processor. The processor may generally include any number of microprocessors, ASICs, ICs, etc. The controller 212 may include a memory (e.g., FLASH, ROM, RAM, EPROM and/or EEPROM) that stores instructions that may be executed to carry out one more control routines. As discussed herein, memory includes any non-transient computer readable medium in which programming instructions are stored. For the purposes of this disclosure, the term non-transient computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

The controller 212 receives signals from the various sensors of FIG. 2 and employs the various actuators of FIG. 2 to adjust engine operation based on the received signals and instructions stored on the memory of the controller 212. For example, adjusting the CPV 261 may include adjusting an actuator of the CPV to adjust a flow rate of fuel vapors there-through. As such, controller 212 may communicate a signal to the actuator (e.g., CPV solenoid) of the CPV 261 based on a desired purge flow rate. Accordingly, the CPV solenoid may be opened (and pulsed) at a specific duty cycle to enable a flow of stored vapors from fuel vapor canisters 222 and/or bleed canister 244 to intake manifold 224 via purge line 228.

Fuel system 218 may include a fuel tank 220 coupled to a fuel pump system 221. The fuel pump system 221 may include one or more pumps for pressurizing fuel delivered to the injectors of engine 210, such as the example injector 266. While only a single injector 266 is shown, additional injectors are provided for each cylinder. It will be appreciated that fuel system 218 may be a return-less fuel system, a return fuel system, or various other types of fuel system.

Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

EVAP system 251 may include one or more emissions control devices, such as the one or more fuel vapor canisters 222 (also termed, canisters 222) filled with an appropriate adsorbent. The canisters are configured to temporarily trap fuel vapors (including vaporized hydrocarbons) during fuel tank refilling operations and "running loss" (that is, fuel vaporized during vehicle operation). In one example, the adsorbent used is activated charcoal. In this example, although a single canister is shown, as shown in FIG. 3A, there may be multiple canisters coupled to the vent line 227 in series. Vapors generated in fuel system 218 may be routed to EVAP system 251, via vapor recovery line 231. Fuel vapors stored in fuel vapor canisters 222 may be purged to the engine intake 223 at a later time. Vapor recovery line 231 may be coupled to fuel tank 220 via one or more conduits and may include one or more valves for isolating the fuel tank during certain conditions. EVAP system 251 may further include a canister ventilation path or vent line 227 which may route gases out of the canisters 222 to the atmosphere.

Vent line 227 may allow fresh air to be drawn into canisters 222 when purging stored fuel vapors from canisters 222 to engine intake 223 via purge line 228 and CPV 261 (also termed, purge valve 261). For example, purge valve 261 may be normally closed but may be opened during certain conditions so that vacuum from engine intake manifold 224 is applied to the fuel vapor canisters 222 for purging.

A bleed canister 244 may be housed in the vent line 227 downstream of the fuel vapor canisters 222. The bleed canister 244 may include a dense honeycomb structure configured to capture and trap any hydrocarbons that migrate from the main fuel vapor canisters 222 (that would otherwise escape to the atmosphere). During conditions such as when a vehicle with loaded fuel vapor canisters 222 is parked in a hot weather for a prolonged duration, due to diurnal temperature cycle, some of the HCs stored in the canisters 222 may be desorbed and may flow downstream via the vent line 227. Such HCs that bleed out of the canisters 222 may be captured at the bleed canister 244 to avert the release of the HCs to atmosphere. The bleed canister may be fluidically coupled to the purge line 228 such that during subsequent engine operation, the HCs trapped by the bleed canister 244 may be purged to the engine intake manifold 224.

In some examples, the flow of air between canisters 222 and the atmosphere may be regulated by a CVS 299 coupled within vent line 227. A fuel tank isolation valve (FTIV) 252 may be positioned between the fuel tank and the fuel vapor canister within fuel vapor line 278. FTIV 252 may be a normally closed valve, that when opened, allows for the venting of fuel vapors from fuel tank 220 to canisters 222. Fuel vapors may be stored within canisters 222 and air, stripped of fuel vapors, may then be vented to atmosphere via vent line 227. Fuel vapors stored in fuel vapor canisters 222 may be purged along purge line 228 to engine intake 223 via CPV 261 at a later time when purging conditions exist. As such, FTIV 252 when closed may isolate and seal the fuel tank 220 from the EVAP system 251.

In some examples, recovery line 231 may be coupled to a fuel filler system 219 (or refueling system 219). In some examples, fuel filler system may include a fuel cap 205 for sealing off the fuel filler system from the atmosphere. Refueling system 219 is coupled to fuel tank 220 via a fuel filler pipe or neck 211. Further, refueling system 219 may include refueling lock 245. In some embodiments, refueling lock 245 may be a fuel cap locking mechanism.

Fuel system 218 may be operated by controller 212 in a plurality of modes by selective adjustment of the various valves and solenoids. For example, the fuel system may be operated in a fuel vapor storage mode, wherein the controller 212 may open FTIV 252 while closing CPV 261 to direct fuel vapors into canisters 222 before venting the air to the atmosphere.

As another example, the fuel system may be operated in a refueling mode (e.g., when fuel tank refueling is requested by a vehicle operator), wherein the controller 212 may open FTIV 252, while maintaining CPV 261 closed, to depressurize the fuel tank before allowing fuel to be added therein. As such, FTIV 252 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine running), wherein the controller 212 may open CPV 261 while closing FTIV 252. Herein, the vacuum generated by the intake manifold of the operating engine may be used to draw fresh air through vent line 227 and through fuel vapor canisters 222 to purge the stored fuel vapors into intake manifold 224. In this mode, the purged fuel vapors from the canister are combusted in the engine. The purging may be performed opportunistically, such as when the hybrid vehicle is operated in an engine mode, and/or continued until the stored fuel vapor amount in the canister is below a threshold.

The canisters 222 are sized to absorb all fuel vapors generated during vehicle operation and refueling, therefore, in absence of bleeding of the canisters 222, the bleed canister 244 may remain largely empty. Due to the infrequent use of the bleed canister, there may not be a substantial number of opportunities available for diagnostics of the bleed canister 244. In the absence of regular diagnostics, any degradation of the bleed canister 244 may remain undetected and may result in undesired levels of emissions.

Diagnostics of the bleed canister 244 may be opportunistically carried out during a refueling event. During the refueling event, upon a fuel level indicator (FLI) in a fuel tank being lower than a threshold, fuel vapors from the fuel system may be directed to one or more main fuel vapor canisters 222. Directing fuel vapors to the one or more fuel vapor canisters include maintaining one or more bypass valves housed in bypass passages corresponding to each of the one or more fuel vapor canisters in their respective closed positions. Once the FLI reaches the threshold, the fuel vapors may be directed to the bleed canister 244 bypassing the one or more fuel vapor canister 222. Directing fuel vapors solely to the bleed canister 244 includes opening each of the one or more bypass valves to bypass flow of fuel vapors from entering the one or more main fuel vapor canisters 222 and route the fuel vapors to the bleed canister. During the refueling event, the FTIV 252 may be maintained in an open position, and the CPV 261 may be maintained in a closed position. During the subsequent engine start, upon completion of the refueling event, the FTIV may be closed, the CPV may be opened, the bypass valves may be maintained in the open position to route fuel vapors from the bleed canister 244 to the engine intake manifold. An output of the exhaust gas sensor 226 may be monitored for a threshold duration during the purging of the bleed canister 244. The bleed canister 244 may be indicated to be robust in response to the output of the exhaust gas sensor being richer than stoichiometric upon opening of the CPV 261 and then switching to leaner than stoichiometric within the threshold duration. The bleed canister 244 may be indicated to be degraded in response to the output of the exhaust gas sensor being leaner than stoichiometric upon opening of the CPV or the output of the exhaust gas sensor not switching to leaner than stoichiometric within the threshold duration. After completion of the threshold duration, the bypass valves may be closed, the CPV 261 may be closed, and the FTIV 252 may be opened. In response to indication of the bleed canister being degraded, a frequency of purging of the one or more main fuel vapor canisters 222 may be increased to mitigate the adverse effects of degradation of the bleed canister 244. An example method for diagnostics of the bleed canister 244 is shown in FIG. 4.

Referring now to FIG. 3A, an example 300 of an EVAP system 251 of a vehicle is shown, which may be the same as or similar to the EVAP system 251 of FIG. 2, connected to a fuel system 218 of the vehicle. EVAP system 251 may have a plurality of canisters 222 arranged between a CPV 261 (e.g., leading to an engine intake manifold) coupled to a purge line 228 and a CVS 299 coupled to a vent line 227. The canisters 222 may be further coupled to the fuel system 218, including the fuel tank 220 and a vapor recovery line 344 coupled to a fuel filler system 340, via a fuel vapor line 278 and one or more vent valves, such as a fuel limit vent valve (FLVV) 346. An FTIV 252 may be actuated open or closed to allow fuel vapors to pass from the fuel tank 220 to the canisters 222 or seal the EVAP system from the fuel tank 220, and an FTPT 291 arranged on the fuel vapor line 278 may measure and/or monitor a pressure of the fuel system 218.

In the example EVAP system 251, the canisters 222 include a first canister 302, a second canister 304, and a third canister 306 coupled to the vent line 227 and the purge line 228. In one example, the first canister 302, the second canister 304, and the third canister 306 are arranged in a series, where fuel vapors originating in the fuel tank 220 may pass through the first canister 302, out of the first canister 302 into the second canister 304, and out of the second canister 304 into the third canister 306. Additionally, each of the canisters 222 may include a bypass conduit with a bypass valve, such that when a bypass valve is closed, fuel vapors originating in the fuel tank 220 may enter the respective canister, and when the bypass valve is open, the fuel vapors may not enter the respective canister and may bypass the respective canister via the respective bypass conduit. In the depicted example, a first bypass conduit 326 with a first bypass valve 312 bypasses the first canister 302, a second bypass conduit 328 with a second bypass valve 314 bypasses the second canister 304, and a third bypass conduit 330 with a third bypass valve 316 bypasses the third canister 306.

For example, during operation of the vehicle, the CVS 299 may be opened to atmosphere, drawing in a flow of fuel vapors from the fuel system 218 into the first canister 302, from the first canister 302 into the second canister 304, and from the second canister into the third canister 306. The flow of air through the first canister 302, the second canister 304, and third canister 306 (e.g., in order) may cause the first canister 302 to become loaded with fuel vapors before each of the second canister 304 and the third canister 306 become loaded. If the first canister 302 becomes loaded prior to the second canister 304 and the third canister 306, the first bypass valve 312 of the first canister 302 may be opened, thereby allowing the fuel vapors to bypass the first canister 302 via the first bypass conduit 326 and enter into the second canister 304. If the second canister 304 becomes loaded prior to the third canister 306 becoming loaded, the second bypass valve 314 of the second canister 304 may be opened, thereby allowing the fuel vapors to bypass the second canister 304 via the second bypass conduit 328 and enter into the third canister 306. By allowing the fuel vapors to bypass one or more fuel vapor canisters that become loaded, an efficiency of the EVAP system 251 may be increased.

In one example, a controller of the vehicle estimates a loading of the first canister 302, the second canister 304, and/or the third canister 306 by estimating a combustion air/fuel ratio from an exhaust gas of the vehicle. The air/fuel ratio may be inferred from a measurement of oxygen in a sample of the exhaust gas via a universal exhaust gas oxygen (UEGO) sensor. For example, during a routine to estimate canister loading, the CPV 261 may be slowly opened to allow air from the EVAP system 251 to enter the engine, while a deviation of an air/fuel ratio from a stoichiometric air/fuel ratio is measured. If the deviation of the air/fuel ratio from a stoichiometric air/fuel ratio exceeds a threshold deviation (e.g., 30%), it may be inferred that one or more canisters are loaded. Further, one or more of the first bypass valve 312, the second bypass valve 314, and the third bypass valve 316 may be opened to selectively determine whether first canister 302, the second canister 304, and/or the third canister 306 are loaded. For example, the first canister 302 may be loaded, the second canister 304 may not be loaded, and the third canister 306 may not be loaded. The UEGO sensor may provide feedback to the controller that the deviation of the air/fuel ratio from the stoichiometric air/fuel ratio exceeds the threshold deviation, indicating that air filtered through the first canister 302, the second canister 304, and the third canister 306 is over-enriched. The controller may open the first bypass valve 312, whereby fresh air entering the EVAP system 251 via the CVS 299 passes through the second canister 304 and the third canister 306, but passes through the first bypass conduit 326 and not through the first canister 302. As a result of the fresh air not passing through the first canister 302, the UEGO sensor may indicate that the deviation of the air/fuel ratio from the stoichiometric air/fuel ratio does not exceed the threshold deviation, whereby it may be inferred that the second canister 304 and the third canister 306 are not loaded. The controller may open the second bypass valve 314 and the third bypass valve 316, and close the first bypass valve 312, whereby fresh air entering the EVAP system via the CVS 299 does not pass through the second canister 304 and the third canister 306, but passes through the second bypass conduit 328, the third bypass conduit 330, and the first canister 302. As a result of the fresh air not passing through the second canister 304 and the third canister 306 and passing through the first canister 302, the UEGO sensor may indicate that the deviation of the air/fuel ratio from the stoichiometric air/fuel ratio exceeds the threshold deviation, whereby it may be inferred that the first canister 302 is loaded. Thus, a threshold fuel vapor load of a canister may be inferred from the threshold deviation of the air/fuel ratio.

A bleed canister 244 is housed in the vent line 227 downstream of each of the first canister 302, the second canister 304, and the third canister 306 to adsorb any HCs escaping from the canisters. If each of the first bypass valve 312, the second bypass valve 314, and the third bypass valve 316 are opened, fuel vapor from the fuel vapor line 278 may directly flow to the bleed canister 244 bypassing the each of the first canister 302, the second canister 304, and the third canister 306. A purge conduit 334 may directly couple the bleed canister 244 to the purge line 228 to route the HCs trapped in the bleed canister to the engine intake manifold via the CPV 261 without flowing through any of the first canister 302, the second canister 304, and the third canister 306.

In this way, the components described in FIGS. 1-3A enable a system for an engine, comprising one or more main fuel vapor canisters of an evaporative emissions control (EVAP) system housed in a vent line configured to receive and store fuel vapors from a fuel system, one or more bypass passages corresponding to each of the one or more main fuel vapor canisters, each bypass passage of the one or more bypass passages housing a bypass valve, a bleed canister including a honeycomb structure coupled to the vent line downstream of the one or more main fuel vapor canisters, and a controller storing instructions in non-transitory memory that, when executed, cause the controller to: diagnose degradation of the bleed canister during a refueling event.

FIG. 4 shows an example method 400 for diagnostics of a bleed canister (such as bleed canister 244 in FIG. 3A) in an EVAP system (such as EVAP system 251 in FIG. 3A). Instructions for carrying out method 400 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 402, method 400 includes estimating and/or measuring vehicle operating conditions of the vehicle. Vehicle operating conditions may be estimated based on one or more outputs of various sensors of the vehicle (e.g., such as oil temperature sensors, engine velocity or wheel velocity sensors, torque sensors, etc., as described above in reference to vehicle propulsion system 100 of FIG. 1). Vehicle operating conditions may include engine velocity and load, vehicle velocity, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor velocity, battery charge, engine torque output, vehicle wheel torque, etc. Further, a state of loading of one or more fuel vapor canisters (such as canisters 222 in FIG. 3A) may be estimated. The state of loading may be estimated based on one or more of an output of an UEGO sensor, a purge schedule of the canisters, and a duration of opening of the FTIV (such as FTIV 252 in FIG. 3A) after a purge. Estimating and/or measuring vehicle operating conditions may include determining whether a purge routine of the EVAP system is being carried out. Once a purge routine is completed and the FTIV is not opened following the purging, it may be inferred that the canisters 222 are substantially empty (such as with less than 10% loading).

At 404, the routine includes determining if conditions are met for carrying out diagnostics of the bleed canister. The conditions for diagnostics may include, the vehicle being in an off condition such as following a vehicle key-off request. During a vehicle off condition, the vehicle is not propelled using engine torque or motor torque. The conditions for diagnostics may also include initiation of a refueling event. In some examples, the refueling event may be determined to be initiated when a fuel level of the fuel tank (such as fuel tank 220 in FIG. 3A) increases at a higher than threshold rate for a threshold duration. In other examples, the refueling event may be determined to be initiated responsive to a signal received from an external fuel pump via a wireless network indicating that the external fuel pump has started dispensing fuel to the vehicle. In other examples, the refueling event may be determined to be initiated responsive to the fuel dispensing device being fluidically coupled to the refueling system (such as refueling system 219 in FIG. 2) of the vehicle. The conditions for diagnostics may further include the fuel vapor canisters being clean such as having a lower than threshold load. The fuel vapor canisters may be deemed clean if the canisters have been purged during the immediately previous drive cycle without significant loading (such as less than 10% loading of the loading capacity) of the canisters thereafter.

If it is determined that each of the conditions for carrying out diagnostics of the bleed canister is not met, at 405, current engine operation may be continued without initiating diagnostics of the bleed canister. In the current engine operation, fuel vapor may be routed to the fuel vapor canisters for storage and the canisters may be periodically and/or opportunistically purged to the intake manifold.

If it is determined that each of the conditions for carrying out diagnostics of the bleed canister is met, at 406, the controller may send a signal to the actuator for the FTIV to actuate the FTIV to an open position to establish fluidic communication between the fuel system and the fuel vapor canisters. Since refueling is being carried out, fuel vapor is generated at the fuel tank and the fuel lines which may be routed to the fuel vapor canisters via the fuel vapor line. Each of the first bypass valve (such as first bypass valve 312 in FIG. 3A), the second bypass valve (such as second bypass valve 314 in FIG. 3A), and the third bypass valve (such as third bypass valve 316 in FIG. 3A) may be maintained in a closed position to route the fuel vapor to the main fuel vapor canisters including the first canister, the second canister, and the third canister (such as first canister 302, second canister 304, and third canister 306 in FIG. 3A) in series. In this way, the refueling vapors may be stored in one or more of the first, second, and third canisters. Since the canisters are sized to adsorb an entire volume of vapors generated during refueling, any vapor may not reach the bleed canister.

At 408, during the refueling, the fuel level in the fuel tank may be monitored via a fuel level sensor. During the refueling, the fuel level may steadily increase. At 410, the routine includes determining if the fluid level indicator (FLI) in the tank has reached 90% of total tank capacity. If it is determined that the FLI has not reached the 90% of the total capacity, at 412, the fuel vapors may continue to be routed to the main canisters and not enter the bleed canister.

If it is determined that FLI has reached 90% of total tank capacity, at 414, each of the bypass valves of the main fuel vapor canisters may be opened to route fuel vapor from the fuel system to the bleed canister. Each of the first bypass valve, the second bypass valve, and the third bypass valve is actuated to their respective open positions to establish direct fluidic communication between the bleed canister and the fuel vapor line bypassing the three main canisters. The bleed canister is sized to adsorb fuel vapors generated during the final 10% filling of the fuel tank.

FIG. 3B shows an example 350 of operation of the EVAP system 251 of FIG. 3A during diagnostics of the bleed canister while the fuel tank is refueled. Dashed line 360 shows the route of fuel vapor flow from each of the fuel filler system 340 and the fuel tank 220 to the bleed canister 244 bypassing each of the first canister 302, the second canister 304, and the third canister 306. Fuel vapor from the fuel filler system 340 may flow to the fuel vapor line 278 via the vapor recovery line 344 and the open FTIV 252. Upon opening of each of the first bypass valve 312, the second bypass valve 314, and the third bypass valve 316, the fuel vapor from the fuel vapor line 278 may flow to the bleed canister via the first bypass conduit 326, the second bypass conduit 328, and the third bypass conduit 330 without entering any of the first canister 302, the second canister 304, and the third canister 306. In this way, the bleed canister 244 may be loaded during a remaining portion of the refueling event.

Returning to FIG. 4, at 416, the routine includes determining if engine is started following the completion of refueling. Once refueling is complete, the fuel filler system is sealed and fuel is no longer added to the fuel tank. The engine may be restarted to drive the vehicle e.g. out of a gas station. The engine start may be detected in response to an accelerator pedal tip-in followed by engine cranking and combustion of air and fuel in the engine cylinders. If it is determined that the engine has not been started yet, the canister purge valve (such as CPV 261 in FIG. 3A) may be maintained in a closed position to prevent fuel vapor from entering the engine intake manifold from the EVAP system.

If an engine start is detected upon completion of the refueling, at 420, the FTIV may be actuated to a closed position to suspend flow of fuel vapor from the fuel system to the EVAP system, and the CPV is opened to establish fluidic communication between the EVAP system and the engine intake manifold. Each of the first bypass valve, the second bypass valve, and the third bypass valve may be maintained in their respective open positions. Upon the opening of the CPV, due to the lower engine intake manifold pressure, air from the EVAP system is evacuated to the intake manifold including fresh air entering the EVAP system via an open canister vent valve (such as CVS 299 in FIG. 3A). Due to the least resistance offered, the air may flow from the vent line to the purge line via the bleed canister and the purge conduit (such as purge conduit 334 in FIG. 3A) directly coupling the bleed canister to the purge line. The fuel vapors adsorbed at the bleed canister during the refueling (last 10%) may be routed to the intake manifold via the purge conduit, the purge line, and the open CPV. Due to the first bypass valve, the second bypass valve, and the third bypass valve being open, the air from the vent line may flow through the bypass lines of the canisters instead of flowing through the first canister, the second canister, and the third canister, thereby not removing fuel vapors from the canisters. In this way, fuel vapor may only be routed from the bleed canister and not the main canisters to the intake manifold.

FIG. 3C shows an example 360 of operation of the EVAP system 251 of FIG. 3A during diagnostics of the bleed canister while the while the bleed canister 244 is purged. Dashed line 336 shows the route of desorbed fuel vapor flow from the bleed canister 244 to the engine intake manifold via the purge line 228 and the open CPV 261. As fresh air enters the vent line 227 via the open CVS 299, the fresh air may draw out HCs from the bleed canister 244 and route the HCs to the intake manifold via the purge conduit 334 and the purge line 228.

Returning to FIG. 4, during purging of the bleed canister to the engine intake manifold, at 422, output of an output of a universal exhaust gas oxygen (UEGO) sensor (such as exhaust gas sensor 226 in FIG. 2) may be monitored over a threshold duration. The threshold duration may be pre-calibrated based on the size of the bleed canister and the amount of fuel vapor adsorbed in it during the refueling. The threshold duration may be sufficient to completely purge the bleed canister and remove all the adsorb HCs from the bleed canister. Combustion of the purged HC may generate a richer than stoichiometric air/fuel ratio which is detected by the UEGO sensor.

After completion of the threshold duration, at 424, the routine includes determining if the UEGO output has switched from richer than stoichiometric air/fuel ratio to leaner than stoichiometric air/fuel ratio. Once the entire volume of HCs is purged from the bleed canister, the UEGO output may no longer remain richer than stoichiometric air/fuel ratio and may switch to leaner than stoichiometric air/fuel ratio, therefore the switch from rich to lean may be indicative of completion of bleed canister purge. If it is determined that within the completion of the threshold duration, the UEGO sensor output switches from richer than stoichiometric air/fuel ratio to leaner than stoichiometric air/fuel ratio, it may be inferred that the bleed canister was able to store the fuel vapors during refueling and effective purging of the bleed canister was successful. At 428, the bleed canister may be indicated to be robust and capable of adsorbing nay bleed fuel vapor which can later be purged to the intake manifold. At 430, upon completion of the bleed canister diagnostic routine, each of the first bypass valve, the second bypass valve, and the third bypass valve of the main canisters may be closed to resume routing of fuel vapors from the fuel system to the first canister, the second canister, and the third canister (not directly to the bleed canister).

If it is determined that upon completion of the threshold duration, the UEGO sensor output does not switch from richer than stoichiometric air/fuel ratio to leaner than stoichiometric air/fuel ratio, it may be inferred that the bleed canister is not functioning as desired. At 426, a diagnostic code (Flag) may be set indicating degradation of the bleed canister. In one example, if the bleed canister was unable to adsorb the fuel vapors during the refueling such as due to a blockage, the UEGO sensor output may not be richer than stoichiometric air/fuel ratio during the threshold duration (since there is no HC being purged from the bleed canister). In another example, if the bleed canister was unable to be purged due to a blockage in the purge conduit, the UEGO sensor output may not be richer than stoichiometric air/fuel ratio during the threshold duration. Therefore, a leaner than stoichiometric air/fuel ratio during the threshold duration and absence of transition in UEGO output may confirm a blockage in the bleed canister or the purge conduit.

In response to detection of degradation of the bleed canister, at 427, the purge schedule for the main canisters (first, second, and third canisters) may be updated such that the canisters are not overloaded that can lead to bleeding of HCs. Since the bleed canister is degraded, the bleed HCs from the main canisters may no longer be adsorbed at the bleed canister, hence to reduce the possibility of the bleed HCs to escape to the atmosphere, the frequency of purging of the main canisters may be increased. Upon completion of the bleed canister diagnostic routine, at 430 each of the first bypass valve, the second bypass valve, and the third bypass valve of the main canisters may be closed to resume routing of fuel vapors from the fuel system to the first canister, the second canister, and the third canister.

In this way, upon conditions for diagnostics of a bleed canister of an evaporative emissions control (EVAP) system being met, fuel vapor is routed from a fuel system to the bleed canister bypassing one or more main fuel vapor canisters. During an immediately subsequent engine start, the bleed canister may be purged to an engine intake manifold for a threshold duration, and degradation of the bleed canister may be indicated based on an output of an universal exhaust gas oxygen (UEGO) coupled to an exhaust manifold of the engine.

FIG. 5 shows an example operating sequence 500 for carrying out diagnostics of a bleed canister (such as bleed canister 244 in FIG. 3A) of an EVAP system in a vehicle. The horizontal (x-axis) denotes time and the vertical markers t1-t6 identify significant times in the bleed canister diagnostics.

The first plot, line 502, denotes engine speed during vehicle operation. The second plot, line 504, denotes refueling being carried out when fuel is dispensed to a fuel tank of the vehicle via a fuel fill system. The third plot, line 506, denotes a position of a canister purge valve (such as CPV 261) housed in a purge line regulating flow of purges fuel vapor from the EVAP system to the engine intake manifold. The fourth plot, line 508, denotes positions of each of the bypass valves (such as first bypass valve 312, second bypass valve 314, and third bypass valve 316 in FIG. 3A) of the main fuel vapor canisters (such as first canister 302, second canister 304, and third canister 306 in FIG. 3A). The fifth plot, line 510, denotes a position of a fuel tank isolation valve (such as FTIV 252 in FIG. 3A) housed in a fuel vapor line to regulate flow of fuel vapor from the fuel system to the main canisters and/or the bleed canister. The sixth plot, line 512, denotes a fuel fill level indicator (FLI) in the fuel tank during refueling as estimated via a fuel level sensor coupled to the fuel tank. First dashed line 513 denotes a threshold corresponding to a FLI of 90% of the total capacity of the fuel tank. Second dashed line 514 denotes a maximum (100% FLI) capacity of the fuel tank. The seventh plot, line 516, denotes an output of an UEGO sensor (such as exhaust gas sensor 226 coupled to an exhaust manifold). Dashed line 517 denotes a stoichiometric air/fuel ratio. The eighth plot, line 518, denotes a position of a flag signifying degradation of the bleed canister.

Prior to time t1, the engine is operating to propel the vehicle and refueling is not initiated. The FTIV is open to route any fuel vapors from the fuel system to the fuel vapor canisters. The bypass valves (all three) are closed to enable the canisters to be loaded. The CPV is maintained in a closed position to prevent fuel vapors from flowing to the intake manifold from the canisters. The UEGO output is around stoichiometric. Since any degradation of the bleed canister is not being detected yet, the flag is maintained in an off position.

At time t1, the engine is stopped and refueling of the fuel tank is initiated. The initiation of refueling is confirmed by the steady increase in FLI. Between time t1 and t2, the fuel vapors generated during the refueling is routed to the main canisters as each of the bypass valves are closed. At time t2, upon the FLI increasing to 90% capacity (as denoted by first dashed line 513), each of the bypass valves are actuated to their respective open positions to establish direct fluidic communication between the fuel vapor line and the bleed canister bypassing the main canisters. Between time t2 and t3, the fuel vapors are routed to the bleed canister wherein they are trapped.

At time t3, refueling is completed as the FLI increases to the second threshold 514. After completion of refueling, at time t4, the engine is restarted to propel the vehicle. The CPV is actuated to an open position to establish fluidic communication between the bleed canister and the engine intake manifold, and the FTIV is actuated to a closed position to suspend fluidic communication between the fuel system and the bleed canister. Fresh air is drawn into the vent line due to the lower pressure at the intake system and the air desorbs the fuel vapors adsorbed in the bleed canister and routes the fuel vapors to the intake manifold. In this way, the bleed canister is purged for a threshold duration, the threshold duration being the duration between time t4 and t6.

Over the threshold duration, between time t4 and t6, an output of the UEGO sensor is monitored. Upon initiation of the purging, the UEGO sensor output is richer than stoichiometric. At time t5, the UEGO sensor output transitions from richer than stoichiometric to leaner than stoichiometric indicating completion of purging of the bleed canister. In response to the successful purging of the bleed canister, it is confirmed that the bleed canister is robust to be able to absorb and desorb fuel vapor. In absence of any degradation of the bleed canister, the flag is maintained in an off position. Upon completion of the diagnostics of the bleed canister at time t6, the CPV is actuated back to the closed position and the FTIV is reopened. The bypass valves of the main fuel vapor canisters are closed to route all fuel vapors to the main canisters instead of the bleed canister.

If it was determined that upon initiation of purging (at time t4), the UEGO sensor output is not richer than stoichiometric or does not nor switch to leaner than stoichiometric between time t4 and t6, it would have been inferred that bleed canister is unable to absorb and/or desorb fuel vapors. Consequently, as shown by dashed line 520, the flag would have been set at time t6 indicating degradation of the bleed canister.

In this way, by scheduling diagnostics of a bleed canister during a refueling event, degradation of the bleed canister may be timely identified and suitable mitigating steps may be undertaken. The technical effect of updating a purge schedule of the main fuel vapor canisters in response to indication of degradation of the bleed canister is that the possibility of undesired release of fuel vapors from the main canisters to the atmosphere via the degraded bleed canister may be reduced. Overall, routine diagnostics of all EVAP system components including the bleed canister enables a practically zero emissions vehicles (PZEV) to comply with emissions standards.

An example method for an engine in a vehicle comprises: during a refueling event, upon a fuel fill level (FLI) reaching a threshold, directing fuel vapors solely to a bleed canister of an evaporative emissions control (EVAP) system, and during a subsequent engine start, indicating if the bleed canister is robust or degraded based on output of an exhaust gas sensor. In any or all of the preceding examples, additionally or optionally, during the refueling event, upon the FLI in a fuel tank being lower than the threshold, directing fuel vapors from a fuel system to one or more main fuel vapor canisters. In any or all of the preceding examples, additionally or optionally, the one or more main fuel vapor canisters are coupled in series to a vent line of the EVAP system, and wherein the bleed canister is coupled to the vent line downstream of the one or more main fuel vapor canisters, the bleed canister including a honeycomb structure. In any or all of the preceding examples, additionally or optionally, directing fuel vapors to the one or more main fuel vapor canisters include maintaining one or more bypass valves housed in bypass passages corresponding to each of the one or more main fuel vapor canisters in their respective closed positions. In any or all of the preceding examples, additionally or optionally, directing fuel vapors solely to the bleed canister includes opening each of the one or more bypass valves to bypass flow of fuel vapors from entering the one or more main fuel vapor canisters and route the fuel vapors to the bleed canister. In any or all of the preceding examples, the method further comprising, additionally or optionally, during the refueling event, maintaining a fuel tank isolation valve (FTIV) housed in a fuel vapor line connecting the fuel tank to the one or more main fuel vapor canisters and the bleed canister in an open position, and maintaining a canister purge valve (CPV) housed in a purge line connecting the one or more main fuel vapor canisters and the bleed canister to an engine intake manifold in a closed position. In any or all of the preceding examples, the method further comprising, additionally or optionally, during the subsequent engine start, upon completion of the refueling event, closing the FTIV, opening the CPV, maintaining the bypass valves in the open position to route fuel vapors from the bleed canister to the engine intake manifold, and monitoring the output of the exhaust gas sensor for a threshold duration. In any or all of the preceding examples, additionally or optionally, the exhaust gas sensor is a universal exhaust gas oxygen (UEGO) coupled to an exhaust manifold of the engine, and wherein the threshold duration is pre-calibrated based on a size of the bleed canister. In any or all of the preceding examples, additionally or optionally, the indicating that the bleed canister is robust is in response to the output of the exhaust gas sensor being richer than stoichiometric upon opening of the CPV and then switching to leaner than stoichiometric within the threshold duration. In any or all of the preceding examples, additionally or optionally, the indicating that the bleed canister is degraded is in response to the output of the exhaust gas sensor being leaner than stoichiometric upon opening of the CPV or the output of the exhaust gas sensor not switching to leaner than stoichiometric within the threshold duration. In any or all of the preceding examples, the method further comprising, additionally or optionally, after completion of the threshold duration, closing all of the bypass valves, closing the CPV, and opening the FTIV. In any or all of the preceding examples, the method further comprising, additionally or optionally, in response to indication of the bleed canister as degraded, increase a frequency of purging of the one or more main fuel vapor canisters.

Another example method for an engine in a vehicle, comprises: upon conditions for diagnostics of a bleed canister of an evaporative emissions control (EVAP) system being met, routing fuel vapor from a fuel system to the bleed canister bypassing one or more main fuel vapor canisters, during an immediately subsequent engine start, purging the bleed canister to an engine intake manifold for a threshold duration, and indicating degradation of the bleed canister based on an output of an universal exhaust gas oxygen (UEGO) sensor coupled to an exhaust manifold of the engine. In the preceding example, additionally or optionally, the conditions for diagnostics of the bleed canister includes a refueling event and a lower than threshold loading of the one or more main fuel vapor canisters. In any or all of the preceding examples, additionally or optionally, routing the fuel vapor from the fuel system to the bleed canister is carried out by opening one or more bypass valves housed in one or more bypass passages corresponding to the one or more main fuel vapor canisters, the opening of the one or more bypass valves is in response to a fuel level in a fuel tank of the fuel system increasing to 90% of a total capacity of the fuel tank. In any or all of the preceding examples, additionally or optionally, purging the bleed canister includes opening a canister purge valve (CPV) housed in a purge line connecting the one or more main fuel vapor canisters and the bleed canister to the engine intake manifold while maintaining the bypass valves in the open position to route fuel vapor adsorbed in the bleed canister to the intake manifold via the purge line. In any or all of the preceding examples, additionally or optionally, indicating degradation of the bleed canister is in response to the output of the UEGO sensor being leaner than stoichiometric upon opening of the CPV or the output of the UEGO sensor not switching to leaner than stoichiometric within the threshold duration.

Another example for an engine in a vehicle, comprises: one or more main fuel vapor canisters of an evaporative emissions control (EVAP) system housed in a vent line configured to receive and store fuel vapors from a fuel system, one or more bypass passages corresponding to each of the one or more main fuel vapor canisters, each bypass passage of the one or more bypass passages housing a bypass valve, a bleed canister including a honeycomb structure coupled to the vent line downstream of the one or more main fuel vapor canisters, and a controller storing instructions in non-transitory memory that, when executed, cause the controller to: diagnose degradation of the bleed canister during a refueling event. In the preceding example, additionally or optionally, diagnosis of the bleed canister includes, during the refueling event, adjusting a position of the bypass valve for each bypass passage to route a portion of fuel vapors from the fuel system to the bleed canister, and then during an immediately subsequent engine start, indicating degradation of the bleed canister in response to output of an exhaust gas oxygen sensor not switching from richer than stoichiometric to leaner than stoichiometric within a threshold duration. In any or all of the preceding examples, additionally or optionally, the controller includes further instructions to: upon completion of the diagnostics of the bleed canister, close the bypass valve for each bypass passage to route fuel vapors from the fuel system to the one or more main fuel vapor canisters, and in response to indication of degradation of the bleed canister, update a purge schedule of the one or more main fuel vapor canisters.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising:
   upon conditions for diagnostics of a bleed canister of an evaporative emissions control (EVAP) system being met,
   routing fuel vapor from a fuel system to the bleed canister bypassing one or more main fuel vapor canisters;
   during an immediately subsequent engine start, purging the bleed canister to an engine intake manifold for a threshold duration; and
   indicating degradation of the bleed canister based on an output of a universal exhaust gas oxygen (UEGO) sensor coupled to an exhaust manifold of the engine.

2. The method of claim 1, wherein the conditions for diagnostics of the bleed canister include a refueling event and a lower than threshold loading of the one or more main fuel vapor canisters.

3. The method of claim 1, wherein routing the fuel vapor from the fuel system to the bleed canister is carried out by opening one or more bypass valves housed in one or more bypass passages corresponding to the one or more main fuel vapor canisters, and wherein the opening of the one or more bypass valves is in response to a fuel level in a fuel tank of the fuel system increasing to 90% of a total capacity of the fuel tank.

4. The method of claim 3, wherein purging the bleed canister includes opening a canister purge valve (CPV) housed in a purge line connecting the one or more main fuel vapor canisters and the bleed canister to the engine intake manifold while maintaining the bypass valves in the open position to route fuel vapor adsorbed in the bleed canister to the intake manifold via the purge line.

5. The method of claim 1, wherein indicating degradation of the bleed canister is in response to the output of the UEGO sensor being leaner than stoichiometric upon opening of the CPV or the output of the UEGO sensor not switching to leaner than stoichiometric within the threshold duration.

6. A system for an engine, comprising:
   one or more main fuel vapor canisters of an evaporative emissions control (EVAP) system housed in a vent line configured to receive and store fuel vapors from a fuel system;
   one or more bypass passages corresponding to each of the one or more main fuel vapor canisters, each bypass passage of the one or more bypass passages housing a bypass valve;
   a bleed canister including a honeycomb structure coupled to the vent line downstream of the one or more main fuel vapor canisters; and
   a controller storing instructions in non-transitory memory that, when executed, cause the controller to:
      diagnose degradation of the bleed canister during a refueling event.

7. The system of claim 6, wherein diagnosis of the bleed canister includes, during the refueling event, adjusting a position of the bypass valve for each bypass passage to route a portion of fuel vapors from the fuel system to the bleed canister, and then, during an immediately subsequent engine start, indicating degradation of the bleed canister in response to output of an exhaust gas oxygen sensor not switching from richer than stoichiometric to leaner than stoichiometric within a threshold duration.

8. The system of claim 6, wherein the controller includes further instructions to:
upon completion of the diagnostics of the bleed canister, close the bypass valve for each bypass passage to route fuel vapors from the fuel system to the one or more main fuel vapor canisters, and in response to indication of degradation of the bleed canister, update a purge schedule of the one or more main fuel vapor canisters.

9. A method for an engine, comprising:
during a refueling event, upon a fuel fill level (FLI) in a fuel tank reaching a threshold, directing fuel vapors solely to a bleed canister of an evaporative emissions control (EVAP) system, and, during a subsequent engine start, indicating if the bleed canister is robust or degraded based on output of an exhaust gas sensor, and, during the refueling event with the FLI lower than the threshold, directing fuel vapors from a fuel system to one or more main fuel vapor canisters while maintaining one or more bypass valves housed in bypass passages corresponding to each of the one or more main fuel vapor canisters in their respective closed positions, and further maintaining a fuel tank isolation valve (FTIV) housed in a fuel vapor line connecting the fuel tank to the one or more main fuel vapor canisters and the bleed canister in an open position; and
during the subsequent engine start, upon completion of the refueling event, closing the FTIV, opening a canister purge valve (CPV) housed in a purge line connecting the one or more main fuel vapor canisters and the bleed canister to an engine intake manifold, maintaining the bypass valves in the open position to route fuel vapors from the bleed canister to the engine intake manifold, and monitoring the output of the exhaust gas sensor for a threshold duration.

10. The method of claim 9, wherein the one or more main fuel vapor canisters are coupled in series to a vent line of the EVAP system, and wherein the bleed canister is coupled to the vent line downstream of the one or more main fuel vapor canisters, the bleed canister including a honeycomb structure.

11. The method of claim 9, wherein directing fuel vapors solely to the bleed canister includes opening each of the one or more bypass valves to bypass flow of fuel vapors from entering the one or more main fuel vapor canisters and route the fuel vapors to the bleed canister.

12. The method of claim 9, wherein the exhaust gas sensor is a universal exhaust gas oxygen (UEGO) coupled to an exhaust manifold of the engine, and wherein the threshold duration is pre-calibrated based on a size of the bleed canister.

13. The method of claim 9, wherein the indicating that the bleed canister is robust is in response to the output of the exhaust gas sensor being richer than stoichiometric upon opening of the CPV and then switching to leaner than stoichiometric within the threshold duration.

14. The method of claim 9, wherein the indicating that the bleed canister is degraded is in response to the output of the exhaust gas sensor being leaner than stoichiometric upon opening of the CPV or the output of the exhaust gas sensor not switching to leaner than stoichiometric within the threshold duration.

15. The method of claim 9, further comprising, after completion of the threshold duration, closing all of the bypass valves, closing the CPV, and opening the FTIV.

16. The method of claim 14, further comprising, in response to indication of the bleed canister as degraded, increasing a frequency of purging of the one or more main fuel vapor canisters.

17. The method of claim 9, further comprising, during the refueling event, maintaining the CPV in a closed position.

* * * * *